United States Patent
Zhang

(10) Patent No.: US 9,898,263 B2
(45) Date of Patent: Feb. 20, 2018

(54) SYSTEM AND METHOD FOR RESOURCE-DEFINITION-ORIENTED SOFTWARE GENERATION AND DEVELOPMENT

(71) Applicant: Level 3 Communications, LLC, Broomfield, CO (US)

(72) Inventor: Jordan Zion Zhang, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 386 days.

(21) Appl. No.: 14/248,924

(22) Filed: Apr. 9, 2014

(65) Prior Publication Data
US 2014/0304678 A1 Oct. 9, 2014

Related U.S. Application Data

(60) Provisional application No. 61/894,822, filed on Oct. 23, 2013, provisional application No. 61/810,142, filed on Apr. 9, 2013.

(51) Int. Cl.
G06F 9/44 (2006.01)

(52) U.S. Cl.
CPC . *G06F 8/38* (2013.01); *G06F 8/36* (2013.01)

(58) Field of Classification Search
CPC ..................................... G06F 8/36; G06F 8/60
USPC .......................................................... 717/105
See application file for complete search history.

(56) References Cited

U.S. PATENT DOCUMENTS

| | | | |
|---|---|---|---|
| 8,745,718 B1* | 6/2014 | Dufel ................. | H04L 63/0807 713/155 |
| 8,898,658 B2* | 11/2014 | Ciccone ........................ | 717/173 |
| 8,904,353 B1* | 12/2014 | Arguelles ............ | G06F 11/3672 717/124 |
| 2009/0125554 A1* | 5/2009 | Orient ..................... | H04L 67/22 |
| 2010/0125618 A1* | 5/2010 | Dutta ........................ | G06F 8/10 707/822 |
| 2010/0332529 A1* | 12/2010 | Nayak ....................... | G06F 9/54 707/770 |
| 2011/0113341 A1* | 5/2011 | Liensberger .......... | G06F 9/4443 715/738 |
| 2011/0321032 A1* | 12/2011 | Ciccone .................. | G06F 9/445 717/171 |
| 2013/0104150 A1* | 4/2013 | Rdzak et al. ................. | 719/328 |

\* cited by examiner

*Primary Examiner* — Li B Zhen
*Assistant Examiner* — Hui-Wen Lin

(57) ABSTRACT

A system and method for productively developing web services and associated client software to access web services across entire development lifecycle is disclosed. In various aspects, collections of resource definitions stored and managed in a repository and configured and published as network addressable/accessible resources, serve as a platform with application programming interfaces and/or user-interfaces to enable software professionals to continuously define, design, construct, test, publish and access web services.

19 Claims, 10 Drawing Sheets

API Specification of Billing/v2/Account/billingAccount — 306

| HTTP Method | Request Parameter Definition | Request Body Definition | Response Body Definition | Capability Description |
|---|---|---|---|---|
| GET | GET/Request/Parameters | | GET/Response/Body/TypeDefinition | Get detailed information about billing account |
| PUT | PUT/Request/Parameters | PUT/Request/Body/TypeDefinition | PUT/Response/Body/TypeDefinition | Create or update billing account |

308 — HTTP Method
312 — Request Parameter Definition
314 — Request Body Definition
314 — Response Body Definition
310 — Capability Description

FIG. 3B

| Complex Type Name: Billing/v3/Account/billingAccount | | | | | |
|---|---|---|---|---|---|
| Type Category | Synopsis | Note | Created By | Created Time | Last Updated By |
| ComplexType | details about billing account | empty | LEVEL3:zhang.jordan | 2013-03-21T21:43:21 | LEVEL3:zhang.jordan |

*Type Attribute Filter Here*

| Attribute Name | Attribute Type Name | Synopsis |
|---|---|---|
| billingAccountName | string | Kenan, Bill_Company, billing account company name, from odsAccount.accountName |
| currencyCode | string | The ISO 4217 unique code for the currency like USD |
| marketCode | string | ISO-LongDisplayVenue Code, value like N American, not 100 in value |
| languageCode | string | The ISO 639-1 unique code that identifies a language. Used for invoice formatting like EN, not the Kenan Language code. |
| accountActiveDate | dateTime | Date the account became active. |
| accountInactiveDate | dateTime | Date the account became inactive |

SYSTEM AND METHOD FOR RESOURCE-DEFINITION-ORIENTED SOFTWARE GENERATION AND DEVELOPMENT

CROSS REFERENCES TO RELATED APPLICATIONS

The present non-provisional utility application claims priority under 35 U.S.C. § 119(e) to U.S. Provisional Application No. 61/894,822 entitled "System And Method For Resource-Definition Oriented Software Development," filed on Oct. 23, 2013, and which is hereby incorporated by reference in its entirety.

The present non-provisional utility application also claims priority under 35 U.S.C. § 119(e) to U.S. Provisional Application No. 61/810,142 entitled "System And Method For Resource-Definition Oriented Software Development," filed on Apr. 9, 2013, and which is hereby incorporated by reference in its entirety.

TECHNICAL FIELD

Aspects of the present disclosure relate to software development and in particular to a software platform that enables the automatic generation and continuous development of web services and associated client software for accessing and consuming the web services.

BACKGROUND

The explosion of the Internet and increase of network computing has altered the manner in which software is being developed, deployed, and consumed by users. Rather than developing stand-alone software applications, many businesses are offering software in the form of web services, which are platform-independent, individual pieces of software implemented to perform a specific task within a distributed computing environment, most commonly over a Hypertext Transfer Protocol ("HTTP"), so that each web service may be accessed by heterogeneous software applications.

Due to the distributed nature of web services, any web service development effort typically demands efficient access to environmental and developmental infrastructure. Stated differently, the integrity of the development life-cycle of web services should be streamlined and managed in order to enable efficient and sustainable delivery of web service related software. However, many inefficiencies currently exist in the web services development life-cycle process, in part because current web service developmental processes still rely heavily on conventional development tools and methodologies that have been established for developing stand-alone applications, the use of which result in many challenges for web service developers and associated client software developers. For example, mostly due to the lack of a centralized resource-definition repository, many client software application development cycles are spent performing redundant resource-queries, baseline research, reconciling versioning conflicts between service and client software and the like. There has not been an integrated platform that can fully automate and streamline the development, deployment and management of web services, as well as client software access to these web services.

It is with these problems in mind, among others, that various aspects of the present disclosure were conceived.

SUMMARY

Aspects of the present disclosure involve systems, methods, and/or non-transitory computer-readable mediums for managing web services. The systems, methods, and/or non-transitory computer-readable mediums involve at least one processor in communicatively connected to a repository containing a plurality of resource definitions defining a structure for a corresponding plurality of resources, each resource of the plurality of resources implemented to perform a specific function. The processor is configured to generate one or more user-interfaces configured to generate output corresponding to one or more phases of a development life-cycle of a web service, the web service associating at least two resources of the plurality of resources. The at least one processor is further configured to provide the one or more user-interfaces for display, the one or more user-interfaces includes a dynamically driven first user-interface that is configured to receive query parameter data and resource-location data corresponding to at least one of the at least two resources and display a response identifying a particular instance of the at least one resource of the at least two resources based on the query parameter data and resource location data.

BRIEF DESCRIPTION OF THE FIGURES

Aspects of the present disclosure may be better understood and its numerous objects, features, and advantages, made apparent to those skilled in the art by referencing the accompanying drawings. It should be understood that these drawings depict only typical embodiments of the present disclosure and, therefore, are not to be considered limiting in scope.

FIGS. 3A-3D are block diagrams depicting resources, in accordance with an aspect of the present disclosure.

DETAILED DESCRIPTION

Figure 1:
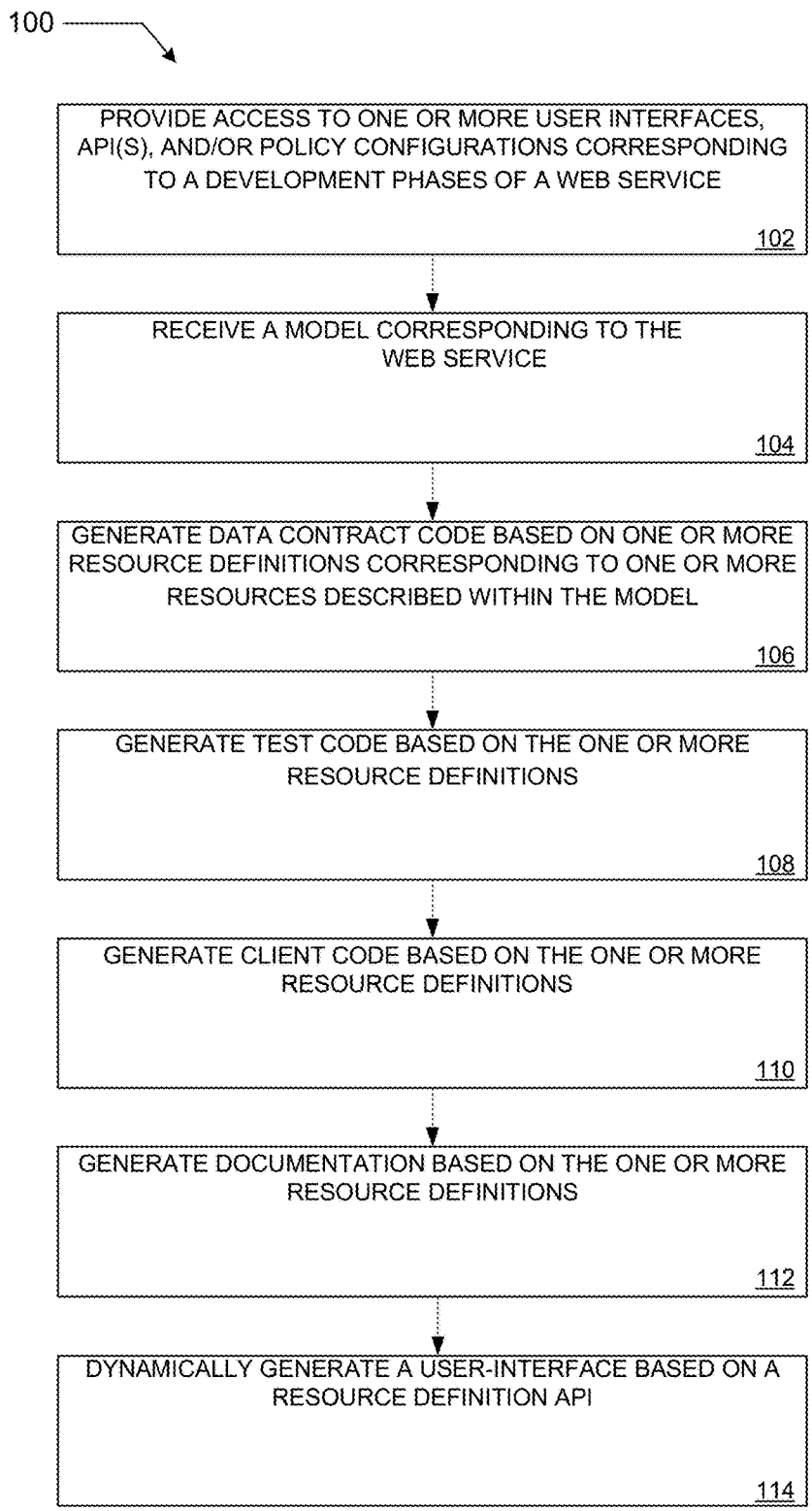
FIG. 1 is a flow chart illustrating a method for developing web services, in accordance with one aspect of the present disclosure.

Aspects of the present disclosure involve a service development platform programmed and configured to simplify and streamline the development, deployment, and management of web services by enabling users to participate in various phases of the software development life-cycle of a web service. In various aspects, a Resource Definition Repository ("RDR") may be used to store and manage definitions of one or more software components that may be modeled, combined, associated, or otherwise grouped together to develop a web service. Subsequently, the service development platform may provide one or more user-interfaces and/or one or more application programming interface, dynamically driven by the RDR that output and/or receive input corresponding to the various phases of the development life-cycle of a web service. Users, such as web service developers and/or business end-users, may interact with the interfaces to access the output generated by the service development platform and/or provide input thereby simplifying a user's ability to develop, deploy, manage and access web services and/or related software.

The software development life-cycle generally describes the phases of software development and the order in which such phases are executed. Typical software development life cycles include a defining/design/modeling phase, an implementation (commonly known as "coding") phase, a testing phase, and a deployment and/or publishing phase. Each phase produces deliverables required by the next phase in the cycle until functioning software is produced. In the design/modeling phase, developers articulate and define the details and requirements for how a piece of software will operate. Code is produced from the deliverables of the design phase during the implementation phase. For developers, the implementation phase is the main focus of the software development life-cycle because during this phase actual code is produced. During the testing phase any code implemented during the implementation phase is tested against the requirements of the design phase to ensure that the code is functioning as intended. Finally, a software product is deployed during the deployment phase once the implemented code has been adequately tested. The various phases may be cycled iteratively with incremental improvement over each cycle.

The concept of a software development life-cycle may be applied to the development of web services. Web services generally refer to independent pieces of software that are provided to a consumer or business over a network, such as the Internet. The web services are designed to allow independent applications to communicate despite their many differences in design and runtime environments. For example, web services are often used by business enterprises to enable such businesses to offer custom business functionality. More particularly, many businesses operate using a variety of older heterogeneous technologies, business applications, and other technological business resources, collectively known as "legacy systems," to perform different business transactions. Web services are used to enable communication between such legacy systems.

Typically, web services are implemented to perform a specific, discrete task and are designed to share their functionality (i.e., logic, data, and/or processes) through an interface (e.g., an application programming interface) across a network based on standard network/Internet data formats and protocols. The specific implementation and/or technical details as to how the web service performs its function is encapsulated within the web service software to enable access to the web service software independent of the hardware or software platform on which it is implemented and independent of the programming language in which it is written.

Developers can access the interface of a web service to integrate the web service within a graphical user interface, such as a web page or executable program, to offer the web service functionality to users. For example, if a business was interested in providing a web page showing customer information to executives, a user could execute a web service entitled, "Customers," that outputs customer data of the current customers of the business. The details as to the different and distributed business systems, data stores, and/or business functionalities that were accessed by the "Customers" web service is hidden; only the results of the execution of the functionality implemented within the "Customers" web service would be provided to the web page for display.

Web services may be implemented according to a variety of paradigms in their invocation and usage, such as for example, according to a representational state transfer ("REST") software paradigm or architecture. A REST architecture abstracts the implementation details of the various architectural elements of a distributed network system, such as servers, clients, gateways, proxies, etc., and provides a standard way, such as a uniform set of stateless operations, for such components to communicate. In particular, the REST architecture consists of clients and servers. The clients initiate requests in a clearly defined structure to a server which processes the requests and provides appropriate responses according to the defined structure. A hypertext transfer protocol ("HTTP") is used to initiate the requests and responses between the clients and servers in a REST architecture.

An important abstraction in the REST architecture is a "resource." A resource is a module, component, object, and/or concept that may be utilized to perform an independent function such as storing data, retrieving data, generating data, and the like. In one embodiment, a resource may be an object with a type, associated data, relationships to other resources, and a set of methods that operate on it. Resources, are similar to an object instance in an object-oriented programming language, with pre-defined standard HTTP based methods (e.g., GET, POST, PUT and DELETE, etc.) to provide business operation capabilities. Each resource is accessible via a global identifier (e.g., a URI in HTTP). Each resource is associated with a data infoset providing access to business data within the same naming and versioning scope. In order to manipulate these resources, components of the network communicate via a standardized interface (e.g., HTTP) and exchange representations of these resources (the actual documents conveying the information).

Aspects of the present disclosure enable web service developers, and in particular, developers implementing web services according to a REST architecture style, the ability to access one or more user-interfaces and/or an application programming interface ("API") to facilitate the development, testing, and deployment of such web services to users (i.e., developers who consume the web service). An API provided to access a centralized RDR may be employed as a mechanism to dynamically drive user-interface generation and/or resource-definition generation during any phase of the web services development life-cycle. For example, if a resource without a resource-definition is under implementation (coding), or alternatively, has already been implemented, a test program corresponding to the resource may leverage a client library with the same programming language as the test program to automatically introspect the type-structure of the resource (object) at run-time and transmit information describing how a resource is defined or otherwise structured to access the RDR using an RDR-API (Resource-Definition-Repository Application Programming interface). Various configurations and/or program settings, such as the configuration of a uniform resource identifier of the RDR within a test program may be used to transmit the structure information to the correct RDR destination. While main embodiments are described according to the REST architecture, it is contemplated that other HTTP service based paradigms and or architectures may be used, such as a simple object access protocol and the like.

Figure 2:
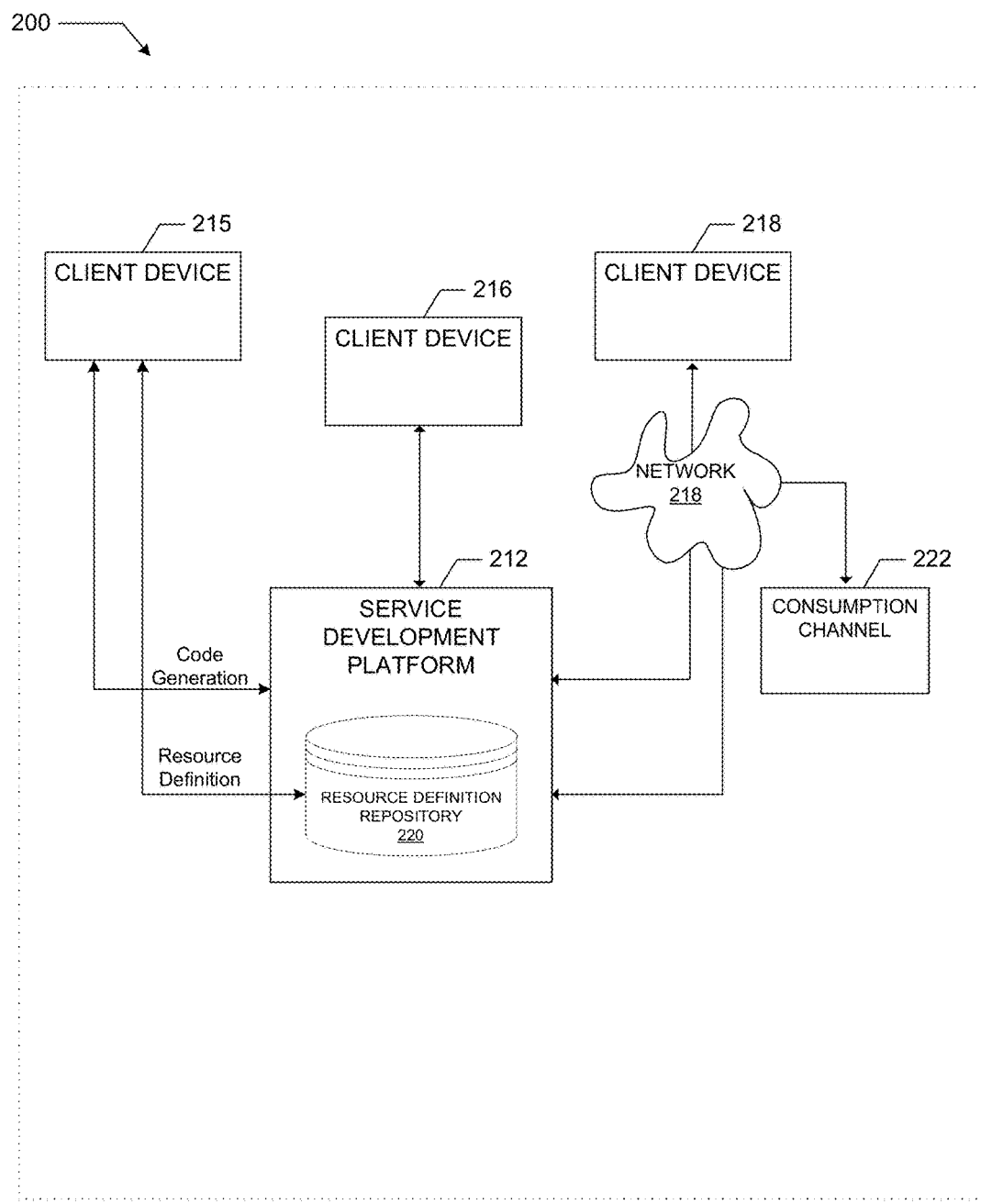
FIG. 2 is block diagram of a computing environment for developing web services, in accordance with one aspect of the present disclosure.
Figure 3A:
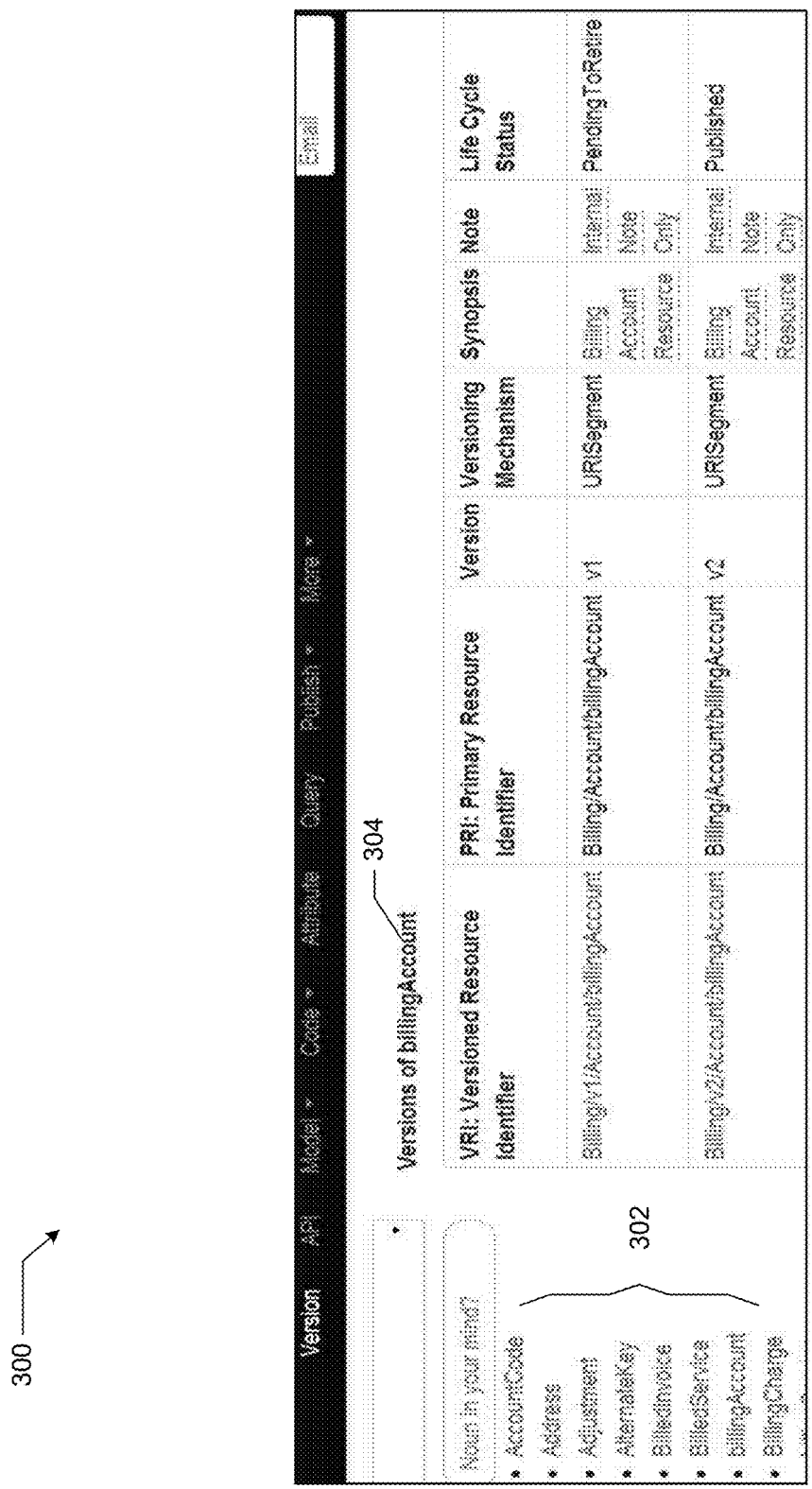
Figure 3D:
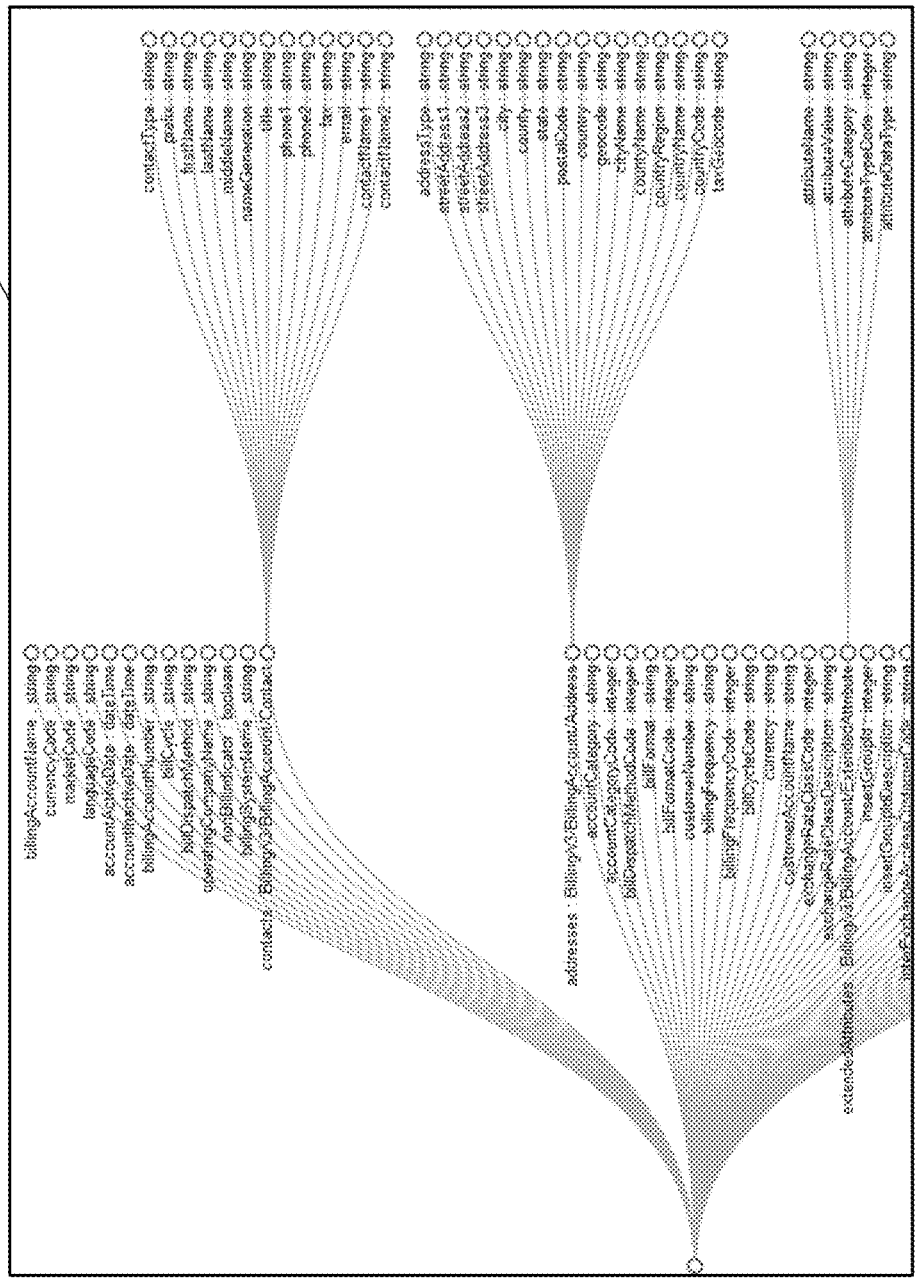

An illustrative method and/or process for managing the development life-cycle of a web service (e.g., the development and deployment of web services) are depicted in FIGS. 1-2. In particular, FIG. 1 illustrates an example method 100 for developing and publishing web services, and FIG. 2 illustrates a computing environment 200 including various hardware systems and/or software components that may be used to execute the method 100.

As illustrated in FIG. 1, method 100 begins with generating, serving or otherwise providing one or more interactive interfaces/input forms (e.g., a user-interface and/or graphical user-interface), one or more APIs, and/or one or more policy-based configurations corresponding to the various phases of a software development life-cycle of a web service (operation 102). The user-interfaces may include various interactive elements, such as buttons, forms, fields, selections, inputs, streams, etc., for facilitating access to resource definitions in the RDR. In one embodiment, the user-interfaces may be driven by an RDR-API that facilitates access to resource-definition(s) in the RDR corresponding to each phase of the development life cycle of a resource/web-service. In another embodiment, policy-configurations may be applied to drive user-expected behavior. For example, when a resource type structure, detected in a resource-test program, is different from the resource-definition in the RDR, the resource-definition in the RDR should be overwritten by the resource-test-program, or the resource-test-program should throw exception indicating there is a detected version conflict with the RDR, all of which may be defined within one or more policy-configurations.

New resource-definitions, e.g., naming identifiers, type-structures and operation descriptions, etc., may be generated, or an existing resource-definition may be modified in the RDR using the interfaces. Resource-definitions can also be generated (if not existing) or modified (if existing) in the RDR by a test program during an implementation phase via the accessed API, such as the RDR-API. Resource-definitions may be generated by reverse-engineering resource's sampling HTTP response via a parser developed based on the RDR-API.

The user-interfaces, APIs, and/or policies may be generated or otherwise provided by a service development platform 212, which may be a personal computer, work station, server, mobile device, mobile phone, processor, and/or other type of processing device and may include one or more processors that process software or other machine-readable instructions. The service development platform 212 may further include a memory to store the software or other machine-readable instructions and data and a communication system to communicate via a wireline and/or wireless communications, such as through the Internet, an intranet, an Ethernet network, a wireline network, a wireless network, and/or another communication network. Any generated content, such as, source code may reside at a client device (such as a web browser) or at a server-side and may be transmittable to any other networked client device.

The service development platform 212 may include a RDR 220, which is a general repository of data including web service/resource data, and/or any other data relating to the development of web services. The RDR 220 may include memory and one or more processors or processing systems to receive, process, query and transmit communications and store and retrieve such data. In another aspect, the RDR 220 may be a database, a database system, data store, database server, or other type of storage device. In one particular embodiment, the generated user interfaces and/or an RDR-API may be used to access the RDR 220.

In one particular embodiment, the RDR 220 may include one or more collections of resource definitions, each of which define the specific structure-details of an individual REST resource. A resource definition includes: a resource-identifier defining how to identify a resource within a namespace and versioning governing scope, a set of operations that the resource supports, such as GET, POST, PUT, DELETE or any combination thereof, or any other standard operation HTTP protocol supported and resource-location defining where to access the resource. The resource definitions may also include the model, i.e., "attribute-structure" defining the structure of HTTP-Request and HTTP-Response of the resource in the form of collections of attribute names and/or its data-type-name, such as commonly used DateTime, number, String or a user-defined complex type such as "Employee." The "attribute" structure of the resource model definition may accommodate code-generation for most commonly used strong-typed programming languages such as JAVA and C# or weak-typed dynamic language such as JAVAscript. It may also be used to generate other schema formats, such as an XML schema format, a JSON schema format, or any other format. In one embodiment, a resource definition may also include an attribute-level description defining what the attribute means, a default-value or sample value, and mapping definition describing a data source corresponding to the attribute. A default URL and/or a sample HTTP request may be included as part of the resource definition.

Referring now to FIGS. 3A-3D, an interface 300 is illustrated depicting example resources and their corresponding resource definitions. In particular, a resource 302 is identified by a primary resource identifier, such as "billingAccount," and further, may have multiple versions identified by a versioned resource identifier 304 such as "Billing/v2/Account/billingAccount" corresponding to respective resource-definitions. At 306, each resource definition defines an API specification that includes an applicable HTTP-Method 308 and a respective capability description 310. For example, in the illustrated embodiment, the "Billing/v2/Account/billingAccount" resource may include a "GET" method 308 that is defined to get detailed information about a billing account 310.

Each defined HTTP method includes an associated Request-parameters definition 312 defining how to send HTTP requests to the resource. The request may include what kind of acceptable parameters, such as query string, and/or Request-Body Definition 314 (left), and/or Response-Body Definitions 314 (right) defining what kind of HTTP response to receive back. Both Request Body-Definition 314 (left) and Response-Body-Definitions 314 (right) are linked to a particular versioned type-definition, wherein each type-definition represents a collection of attribute-definitions defining an attribute name, description, specified data-type-name (e.g., the commonly used (primitive) DateTime), number, string, or a user-defined complex type such as "Address", which may be expressed as another Type-definition. Such multi-level type-structure models may be presented and edited via various graphical user-interfaces provided by service development platform 212, such as for example a Grid-View interface 316, and/or a Tree-View interface 318 with expandable child node such as Address.

The Request-Parameter definition 312 may also represent a collection of attributes and may be considered a special type-definition defining what parameter name, type (such as string or integer), and/or category (such as HTTP query string or HTTP header) a defined HTTP method that the associated resource accepts. For example, for an Invoice resource to provide get-invoice business capability, the resource may accept a combination of parameters, such as billingAccountNumber, invoiceDate, etc.

Although such request parameters may be defined using a user interface provided by the service development platform 212, requests for parameter definitions may also be automatically collected, parsed, generated and/or otherwise transmitted to the RDR 220 via an API at run-time, such as for example, during the test phase of a resource, wherein a test-program is making an HTTP request. Such request parameter definitions as part of a resource-definition residing in the RDR may be used beyond documentation purposes to allow users to understand how to develop client software to access a defined resource. Combined with resource location information defined in the RDR, it may be used to automatically generate software to enable end-users access to the resource directly.

Referring back to FIG. 1, once one or more user-interfaces, and/or API corresponding to various phases of the development life-cycle of a web service have been generated or otherwise accessed, one or more users may interact with the interfaces and APIs, thereby enabling such users to engage or otherwise participate in any aspect of the development life-cycle of a web-service. For example, referring again to FIGS. 1-2, in one embodiment, process 100 includes programmatically generating from a test program, or receiving a model from user-input corresponding to a resource/web-service under development (operation 104). A model is a concept, design, schema, or the like, which may be used as a structure or basis for developing resource/web-service, The modeled structure used for resource-development is usually expressed as a collection of attributes with attribute names and types (e.g., string, number or user-defined complex type/entity). More particularly, the model articulates, in a comprehensive manner, the relationship between entities (things being modeled) and operations (functions a user might want to do to an entity), of a resource or group of related resources. The model generally articulates a high-level description of such relationships; for example, a model might describe an "Employee" as an entity as a subordinate to an entity "Employer", but the model may not necessarily describe specific aspects of the "Employer" resource, such as the Employer address, a link to the Employer resource-model, etc.

Figure 4:
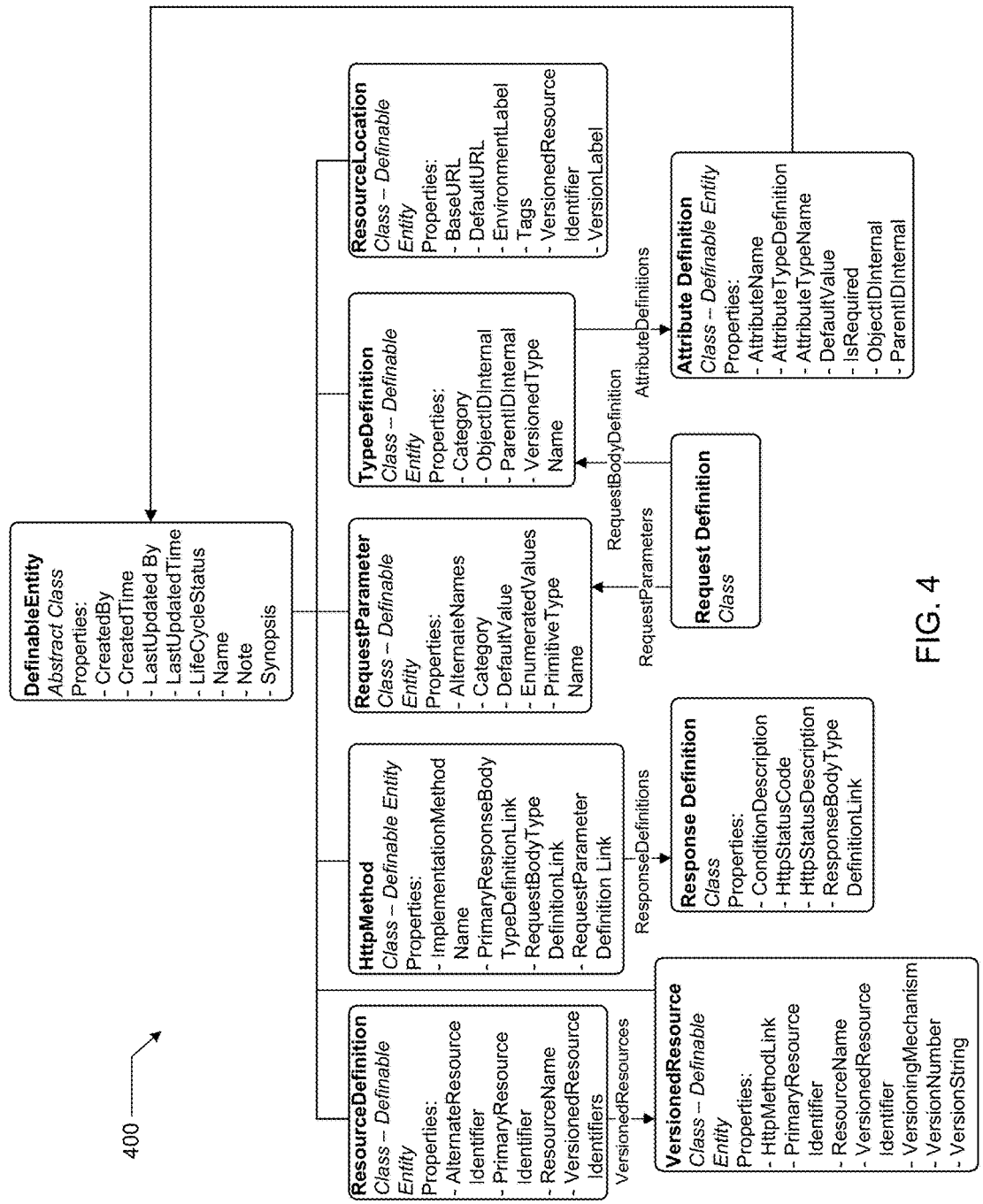
FIG. 4 is block diagram of a model, in accordance with one aspect of the present disclosure.

Referring now to FIG. 4, in the context of a REST SOA architecture, an ontology of Resource-Definitions is illustrated to depict the necessary attributes/properties and essential entities to form a Resource-Definition portfolio that may be generated, versioned, transformed, edited, etc., to facilitate software generation and development productivity during the software development life cycle, particularly during resource-definition oriented software development. The illustrated ontology of Resource-Definitions may be called a meta-model of a resource, as it is a model about the model of a resource. Optionally, the meta-model can serve as a reference model to implement the RDR 220 of the service-development platform 212. The user may access client device(s) 215-218 to interact with the generated content (source-code, documentation or another schema format) by the various user-interfaces or an API, and provide input and/or receive output via a network connection, most commonly a HTTP connection. The client device(s) 215-218 may be a personal computer, work station, server, mobile device, mobile phone, tablet device, processor, and/or other processing device of any suitable type capable of implementing and/or executing server processes, software, applications, etc.

Referring again to FIG. 1, users may interact with the service development platform 212 to request output, based on a user request, source code and/or other output may be dynamically generated corresponding to various aspects of the development life-cycle of a web service. For example, a user interested in the development phase of a web service may access the client device 215 to initiate a request for developing service-side data contract code that may be received by the service development platform 212. In response, the service development platform 212 may automatically generate the data contract code based on the resource definitions stored within the RDR 220 (operation 106) and a reusable content transformation template or logic (performing primitive-type translation) targeting a particular language. A data contract is a formal agreement between a service and a client that abstractly describes the data to be exchanged.

A user interested in participating in the testing phase of the development life-cycle of a web service/resource may access the client device 215 to initiate a request to service development platform 212 to get source code in particular language for testing web services, In response, the service development platform 212 may automatically generate test code based on the resource definitions stored within the RDR 220 (operation 108).

In another embodiment, a user interested in the development phase of the development life-cycle of a web service client application may access the client device 215 to initiate a request to service development platform 212 for developing web service client code and in response the service development platform 212 may automatically generate the client code based on the resource definitions stored within the RDR 220 (operation 110) and programming language-specific code-generation templates or logic (translate generic primitive types such string, dateTime) for each target language or schema.

Often a user may be interested in generating documentation corresponding to the various phases of the development life cycle of a web service. For example, a user may be interested in documentation in a certain format to facilitate development activities or business operation activities. Thus, a user, such as a web service developer, may access the client device 215 to initiate a request for developing such documentation, which may be received by the service development platform 212, and in response, the service development platform 212 may automatically generate the documentation based on the resource definitions stored within the RDR 220 (operation 112). The content may be generated on demand in a standard format (XSD-XML Schema, JSON schema, HTML etc.) and/or in a vendor specific format for documentation, user interaction, system integration, deployment purpose) based on user-defined target-content-template.

Any developed web services/resources may be hosted by a web server (resource-hosting server). Meta-resource (the resource-definition web-service, i.e., RDR-API) may be provided by the service development platform 212 to one or more end users, such as customers, business partners, and/or web service developers. For example, a web service may be provided by the service development platform 212 may be accessible to a developer through a consumption channel 222, which may be a computer, a processing device, a communication device, or the like, such as a personal computer, a server computer, a tablet computer, a mobile processing device, a mobile communication device, and/or the like. The consumption channel 222 may also be a portal (e.g., a web portal), fat client, software application, composite software application, situational mashup application, dashboard, business intelligence tool, and/or an E-Commerce infrastructure comprising a customer portal and external application programming interface.

Figure 7:
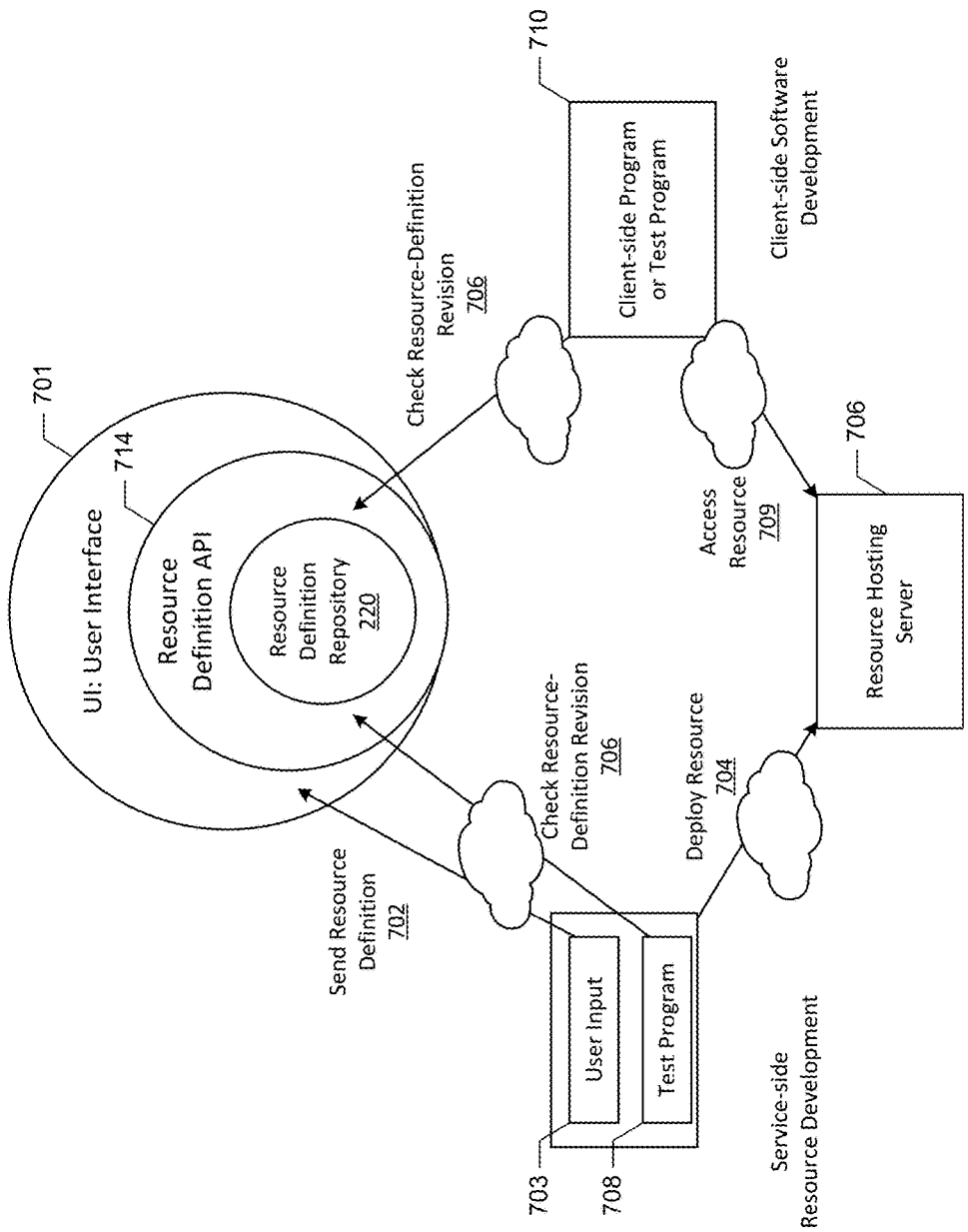
FIG. 7 is block diagram a process for enabling resource-definition changes, in accordance with one aspect of the present disclosure.

Referring now to FIG. 7, a computing architecture 700 for enabling resource-definition changes is illustrated. Stated differently, various service-side development activities, such as sending a resource-definition over a network (at 702) programmatically from a test program 708 or providing user input 703 using the user interface 701, or deploying the resource 704 to a resource-hosting server 706 is illustrated (at 704). At a different time and location, various client-side development activities may be performed. For example, artifacts, such as source-code generated from a resource-definition with the same version resource identifier during these activities may include differences in changes/revisions. Thus, enabled by a language specific library accessible using an RDR-API 714, test programs 708 for service-side resource development, or client-side programs/test programs 710 may execute run-time type-inspections (at 706) and compare against resource-definitions in the RDR 712 with the same version resource identifier. Any differences may be detected systematically and drive policy-driven behavior instead of manual inspection.

Figure 5:
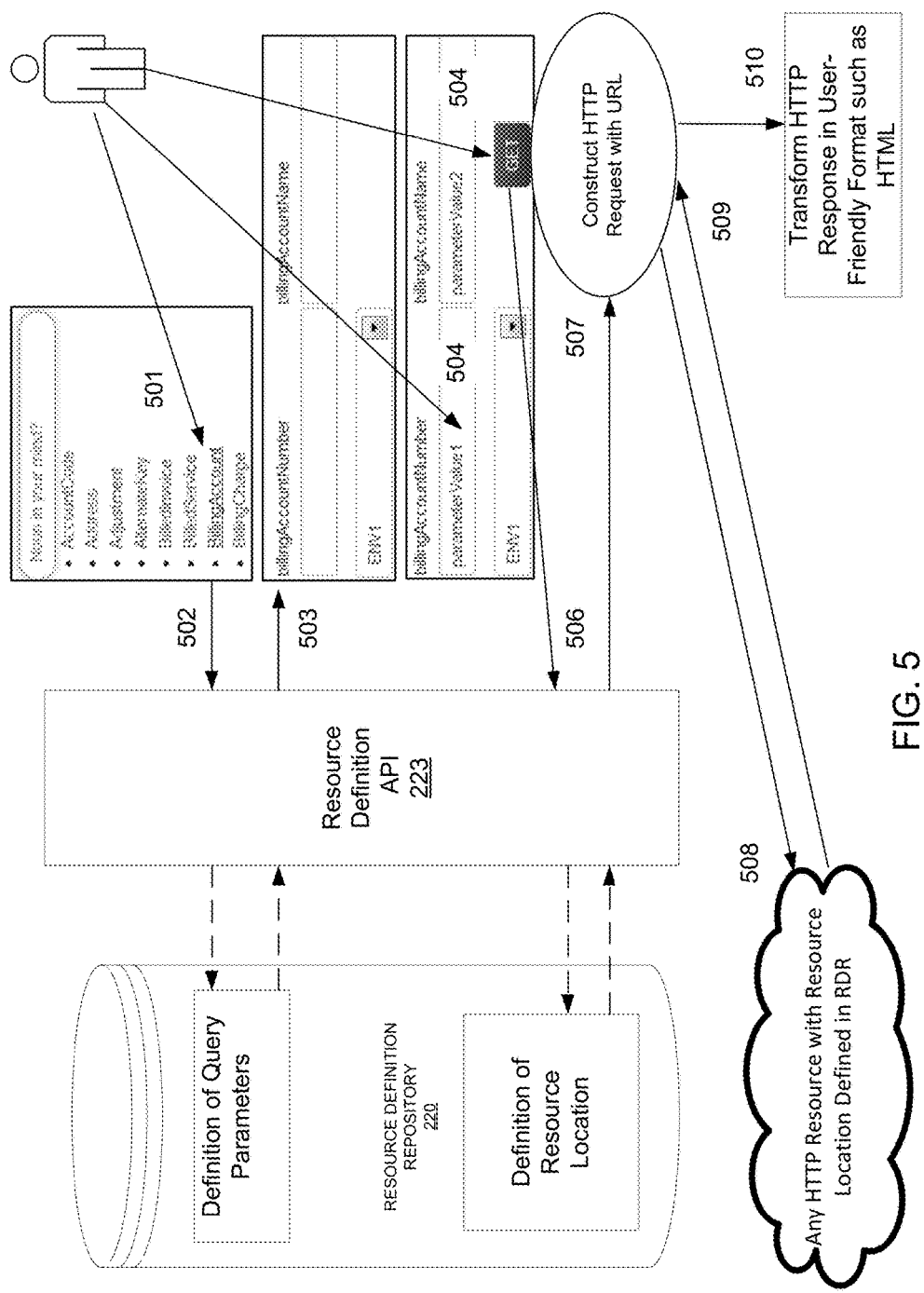
FIG. 5 is block diagram illustrating a process for consuming web services over a universal resource access platform, in accordance with one aspect of the present disclosure.

Any HTTP response that is identified in a common format such as JSON may be reverse-engineered, parsed and transformed into a type-definition as part of the resource-definition portfolio. Moreover, a revision comparisons may be performed by simply by comparing inputs, such two URL, one for the resource to access such as, http://revenueservicetest/ENV1/Billing/v3/Account/billingAccount/189 and one for the meta-resource to access (i.e., a resource about resource-definition of this resource) which contains the type-definition for this resource's HTTP response such as: http://Metaresource/API/typeDefinition/?versioned TypeDefURI=Billing/v3/Account/billingAccount Referring again to FIG. 1, once a web service and/or resource has been developed and deployed, such as for example, to the resource hosting sever 706, a user, such as a web service developer or business end-user, may access the client device 215-218 to dynamically generate a user-interface for directly consuming any deployed web services and/or resources (operation 114). FIG. 5 illustrates an example process for querying web services and/or resources (i.e., consuming web services), according to one embodiment. As long as any given resource definition includes resource parameter and resource-location definition information that has been defined within the RDR 220, the service development platform 212 can dynamically generate user-interfaces that collect user input and subsequently enable a user to interact with a resource by querying a resource definition location or provide resource parameters defined in the RDR. Such capabilities enable direct access to the web services/resource in user-friendly format such HTML and without any additional development efforts. Thus, software developers can complete or otherwise perform essential steps in development workflow cycle such as testing, validation, troubleshooting, and the like. Similarly, business users may perform queries against the selected resource in the above-mentioned way to complete certain business operations involving one or more selected resources.

For example, referring now to step 501 of the illustrated example of FIG. 5, a user selects, via a graphical user interface, a web service/resource name (i.e., BillingAccount) and/or a desired operation method (such as HTTP GET, or PUT etc). In response, at step 502, the graphical user-interface establishes a call to an RDR API 714, which in turn retrieves query parameter information (parameter names, types) corresponding to selected operations (such as HTTP method) of the selected resource (i.e., BillingAccount's latest version, Billing/v3/Account/billingAccount or user-selected version) from the RDR 220. At step 503, the Resource-Definition API (714) returns the obtained query parameter information to the graphical user-interface, and in response, a graphical user-interface configured to receive query parameter data as input is dynamically generated, for example in in user-friend-format such as HTML.

At step 504, a user may provide input, such as one or more parameter values, to the dynamically generated interface for submission (step 506). In response, the resource-location of the selected resource (i.e., selected or latest version of Billing-Account) and, in conjunction with the query parameters, is used to generate a URL (Uniform Resource Locator) such as: http://revenueservicetest/ENV1/Billing/v3/Account/billingAccount?billingAccountName=Level3 as part of a corresponding HTTP request. At step 508, the HTTP request is send to identified resource according to URL constructed. At step 510, the received HTTP response is transformed into a user-friendly format, such as HTML to present to the user who issues the request, in this case, research details about a billing-account. Although the above example is provided using HTTP, it is contemplated that other types of protocols such as SMTP (Simple Mail Transfer Protocol) may be used.

Additional capability may be added to integrate email communication protocols with Platform 212 to enable asynchronous access to resource. For example, in FIG. 5, Step 501 may be performed by a requester who is an email sender within a UI (User Interface) tool integrated with an existing Email client such as Outlook. In response, at step 502, the graphical user-interface establishes a call to an RDR API 223, which in turn retrieves query parameter information (parameter names, types) corresponding to the selected resource (i.e., BillingAccount) from the RDR 220. At step 503, the Resource-Definition API 223 returns the obtained query parameter information to the graphical user-interface, and in response, a graphical user-interface configured to receive query parameter data as input is dynamically generated within Email client. At step 504, an email sender may provide input, such as one or more parameter values, to the dynamically generated interface for submission (step 506) and then populated email subject-line with this constructed VRI (Versioned Resource Identifier) appended by query parameters. Alternatively, Email sender can also bypass the above steps to directly type requested resource URL in subject-line. When the requester sends this email with subject-line such as ENV1/Billing/v3/Account/billingAccount?billingAccountName=Level3, an email server with enhancement integrated with Platform 212 receives this request and parse subject-line to get VRI to locate resource-location definition for this VRI, then the resource-location of this selected resource and, in conjunction with the query parameters, is used to generate a complete URL (Uniform Resource Locator) such as: http://revenueservicetest/ENV1/Billing/v3/Account/billingAccount?billingAccountName=Level3 as part of a corresponding HTTP request. At step 508, the HTTP request is sent by this enhanced email server to destined resource according to URL constructed. At step 510, email server receives HTTP response and transforms it into a user-friendly, email-view-friendly format such as HTML and sends back to the email sender who makes this query-request against this resource such as Billing/v3/Account/billingAccount, containing details about a billing-account. Access-control policy may be applied by comparing sender's username and its resource-access privilege.

A more advanced NLP (Natural Language Processing) and ML (Machine-Learning) capability may be further added to the above-mentioned enhanced email server integrated with Platform 212. This will bypass all the above mentioned user-input steps from 501 to 506. Instead, users send emails, business as usual except adding a CC line to an email address such as smartAnswerMachine@company.com. The enhanced email server receives the email sent to this machine-monitored email address, checks first whether it is from same company within security-governing scope or not, if it is in compliance with security governance, then extract resource-names, query-parameter names and values that the email sender may be interested in via directly pre-processing email body received and applying varieties of NLP and ML technologies such as NER (Named Entity Recognition). Once it can retrieve resource-location from Platform 212 based on versioning policy (such as always retrieving latest version resource-location etc) and construct list of complete URLs appended with query parameters, commonly in HTTP query strings format (step 507), this enhanced email server now can send reply with list of constructed URLs to the original email sender to complete the machine-driven intelligent-search job, let users decide which URL to click in the machine-processed reply and research further these enterprise resources such as account, payment, credit-rating with correlated by machine.

When users click a web service/resource URL directly, usually in XML or JSON, which is not the best format suitable for user research. It can facilitate more user-friendly research when the above-mentioned enhanced email server can constructing a compound URL, such as: http://Metaresource/UI/?URL=http://revenueservicetest/ENV1/Billing/v3/Account/billingAccount?billingAccountName=Level3&expand=all#/query which is constructed by appending direct-resource-access URLs with a Platform 212 provided URL pointing a web user-interface that can transform web-service/resource's HTTP response into user-friendly format such as HTML. In addition, when this Platform 212 provided web user interface is the same one, or contains the same platform-generated user-interface elements as illustrated at Step 504 in FIG. 5, Platform 212 intelligently facilitates email senders with one-click research capability to inspect, or operate resource with any desired parameter value input from users, seamlessly integrated with users' day-to-day communication process.

Figure 6:
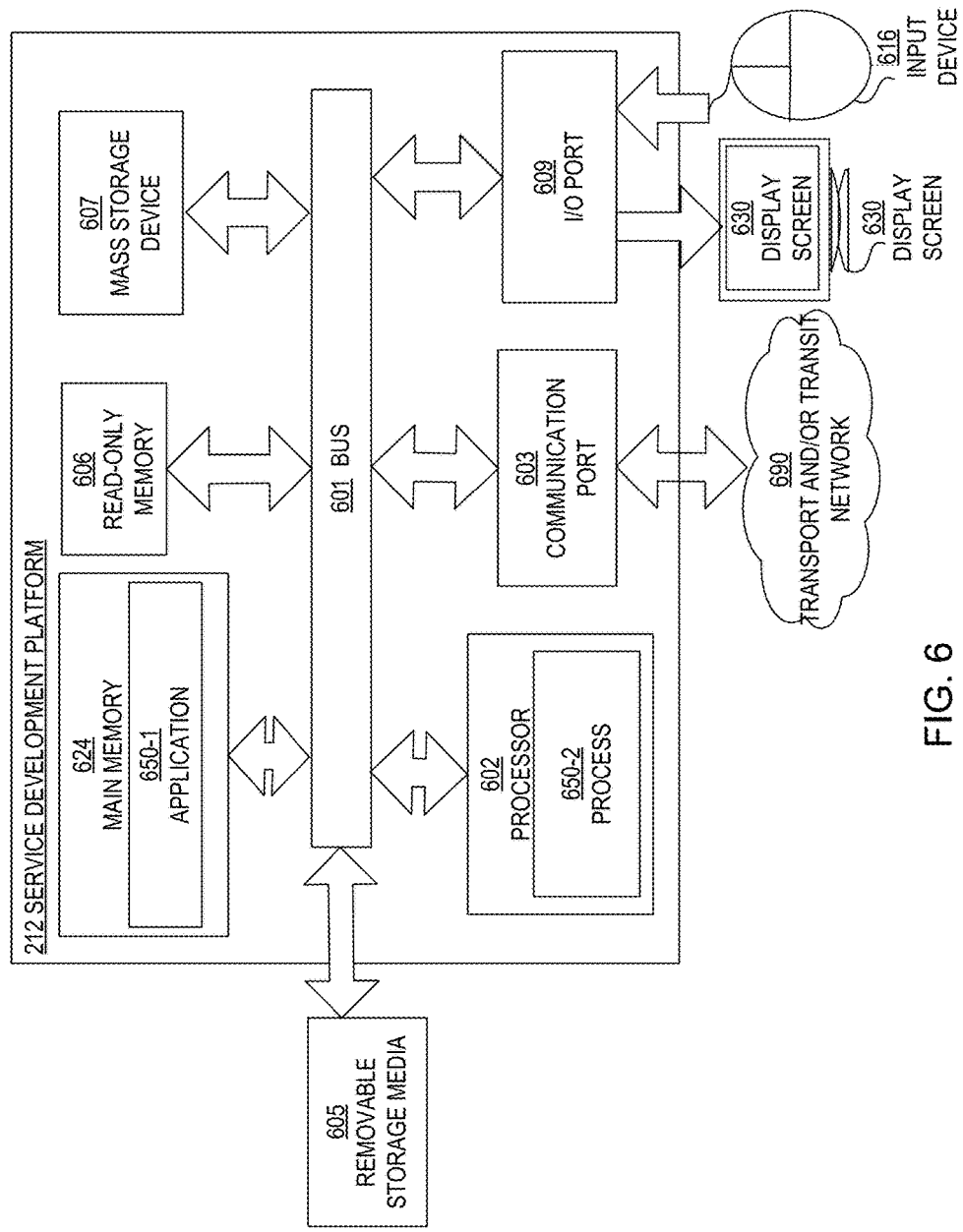
FIG. 6 is block diagram of a processing device, in accordance with one aspect of the present disclosure.

FIG. 6 is an example schematic diagram of a computing system implementing a service development platform 212 that may be used to enable user to participate in the development life-cycle of a web service, according to one embodiment. The computing system for the service development platform 212 includes a bus 601 (i.e., interconnect), at least one processor 602, at least one communication port 603, a main memory 604, a removable storage media 605, a read-only memory 606, and a mass storage device 607. Processor(s) 602 may be any known processor, such as, but not limited to, an Intel® Itanium® or Itanium 2® processor(s), AMD® Opteron® or Athlon MP® processor(s), or Motorola® lines of processors. Communication port 603 may be any of an RS-232 port for use with a modem based dial-up connection, a 10/100 Ethernet port, a Gigabit port using copper or fiber, or a USB port. Communication port(s) 603 may be chosen depending on a network such as a Local Area Network (LAN), a Wide Area Network (WAN), or any network to which the computer system 100 connects. The service development platform 212 may be in communication with peripheral devices (e.g., display screen 630, input device 616 via Input/Output (I/O) port 609.

Main memory 604 may be Random Access Memory (RAM) or any other dynamic storage device(s) commonly known in the art. Read-only memory 606 may be any static storage device(s) such as Programmable Read-Only Memory (PROM) chips for storing static information such as instructions for processor 602. Mass storage device 607 may be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 601 may be a PCI/PCI-X, SCSI, or Universal Serial Bus (USB) based system bus (or other) depending on the storage devices used. Removable storage media 605 may be any kind of external hard drives, floppy drives, IOMEGA® Zip Drives, Compact Disc—Read Only Memory (CD-ROM), Compact Disc—Re-Writable (CD-RW), Digital Video Disk—Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions.

As shown, main memory 604 is encoded with an application 650-1 that supports functionality as discussed above and as discussed further below. For example, in one embodiment, the application 650-1 may include or otherwise implement the various processes and/or instructions described herein. The application 650-1 (and/or other resources as described herein) may be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret or otherwise perform the logic instructions of the application 650-1. Execution of the application 650-1 produces processing functionality in process 650-2. In other words, the process 650-2 represents one or more portions of the application 650-1 performing within or upon the processor(s) 202 in the computer system 600.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method may be rearranged while remaining within the disclosed subject matter. The accompanying method claims present elements of the various steps in a sample order, and are not necessarily meant to be limited to the specific order or hierarchy presented.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for managing web services comprising:
at least one processor communicatively connected to a repository containing a plurality of resource definitions defining a structure for a corresponding plurality of resources, each resource of the plurality of resources implemented to perform a specific function, the at least one processor configured to:
    generate one or more user-interfaces configured to generate output corresponding to one or more phases of a development life-cycle of a web service, the web service associating at least two resources of the plurality of resources;
    provide the one or more user-interfaces for display, the one or more user-interfaces includes a dynamically driven first user-interface configured to:
        receive query parameter data and resource-location data corresponding to at least one of the at least two resources; and
        display a response identifying a particular instance of the at least one resource of the at least two resources based on the query parameter data and resource location data;
    wherein the first user-interface is a graphical-user interface corresponding to a modeling phase of the development life-cycle of the web service, the graphical user-interface comprising a model defining the relationship between the plurality of resources and one or more properties of each resource of the plurality of resources;
    access an application programming interface to introspect type-information corresponding to the structure during run-time of the web service; and
    generate the model based on the type-information.

2. The system of claim 1, wherein each resource definition includes a model defining the structure of a hypertext transfer protocol-request and hypertext transfer protocol-response of the corresponding resource in the form of a plurality of attribute names.

3. The system of claim 1, wherein to generate the one or more user-interfaces configured to generate the output corresponding to one or more phases of a development life-cycle of a web service further comprises generating a second graphical user-interface corresponding to a testing phase of the development life-cycle of the web service.

4. The system of claim 1, wherein each resource of the plurality of resource definitions conforms to a particular data structure type and operation structure and wherein each resource of the plurality of resource definitions is associated with a data infoset providing access to business data supporting the web service.

5. The system of claim 1, wherein the at least one processor is further configured to generate a response type-structure definition based on the response and store the response type-structure definition as part of the resource-definition corresponding to the at least one resource.

6. The system of claim 1, wherein the output comprises a web-published application programming interface documentation describing the particular instance of the at least one resource.

7. The system of claim 1, wherein the system further comprises:
    a database including the repository; and
    an hyper transfer text protocol-based application programming interface enabling client software to interact with the plurality of resource definitions included in the repository.

8. A method for managing web services comprising:
generating, using at least one processor, one or more user-interfaces configured to generate output corresponding to one or more phases of a development life-cycle of a web service, the web service associating at least two resources of a plurality of resources corresponding to a plurality of resource definitions included in a repository, the plurality of resource definitions defining a structure for the corresponding plurality of resources, each resource of the plurality of resources implemented to perform a specific function;
serving, using the at least one processor, the one or more user-interfaces for display, wherein the one or more user-interfaces includes a dynamically driven first user-interface configured to:
    receive query parameter data and resource-location data corresponding to at least one of the at least two resources; and
    display a response identifying a particular instance of the at least one resource of the at least two resources based on the query parameter data and resource location data;
wherein the first user-interface is a graphical-user interface corresponding to a modeling phase of the development life-cycle of the web service, the graphical user-interface comprising a model defining the relationship between the plurality of resources and one or more properties of each resource of the plurality of resources;
accessing an application programming interface to introspect type-information corresponding to the structure during run-time of the web service; and
generating the model based on the type-information.

9. The method of claim 8, wherein each resource definition includes a model defining the structure of a hypertext transfer protocol-request and hypertext transfer protocol-response of the corresponding resource in the form of a plurality of attribute names.

10. The method of claim 8, wherein to generate the one or more user-interfaces configured to generate the output corresponding to one or more phases of a development life-cycle of a web service further comprises generating a second graphical user-interface corresponding to a testing phase of the development life-cycle of the web service.

11. The method of claim 8, wherein each resource of the plurality of resource definitions conforms to a particular data structure type and operation structure and wherein each resource of the plurality of resource definitions is associated with a data infoset providing access to business data within the same naming and versioning scope.

12. The method of claim 8, wherein the at least one processor is further configured to generate a response type-structure definition based on the response and store the response type-structure definition as part of the resource-definition corresponding to the at least one resource.

13. The method of claim 8, wherein the output comprises a web-published application programming interface documentation describing the particular instance of the at least one resource.

14. A non-transitory computer readable medium encoded with instructions for managing web services, the instructions, executable by a processor, comprising:
- generating one or more user-interfaces configured to generate output corresponding to one or more phases of a development life-cycle of a web service, the web service associating at least two resources of a plurality of resources corresponding to a plurality of resource definitions included in a repository, the plurality of resource definitions defining a structure for the corresponding plurality of resources, each resource of the plurality of resources implemented to perform a specific function;
- serving the one or more user-interfaces for display, wherein the one or more user-interfaces includes a dynamically driven first user-interface configured to:
  - receive query parameter data and resource-location data corresponding to at least one of the at least two resources; and
  - display a response identifying a particular instance of the at least one resource of the at least two resources based on the query parameter data and resource location data;
- wherein the first user-interface is a graphical-user interface corresponding to a modeling phase of the development life-cycle of the web service, the graphical user-interface comprising a model defining the relationship between the plurality of resources and one or more properties of each resource of the plurality of resources;
- accessing an application programming interface to introspect type-information corresponding to the structure during run-time of the web service; and
- generating the model based on the type-information.

15. The non-transitory computer readable medium of claim 14, wherein each resource definition includes a model defining the structure of a hypertext transfer protocol-request and hypertext transfer protocol-response of the corresponding resource in the form of a plurality of attribute names.

16. The non-transitory computer readable medium of claim 14, wherein to generate the one or more user-interfaces configured to generate the output corresponding to one or more phases of a development life-cycle of a web service further comprises generating a second graphical user-interface corresponding to a testing phase of the development life-cycle of the web service.

17. The non-transitory computer readable medium of claim 14, wherein each resource of the plurality of resource definitions conforms to a particular data structure type and operation structure and wherein each resource of the plurality of resource definitions is associated with a data infoset providing access to business data within the same naming and versioning scope.

18. The non-transitory computer readable medium of claim 14, wherein the at least one processor is further configured to generate a response type-structure definition based on the response and store the response type-structure definition as part of resource-definition corresponding to the at least one resource.

19. The non-transitory computer readable medium of claim 14, wherein the output comprises a web-published application programming interface documentation describing the particular instance of the at least one resource.

* * * * *